United States Patent [19]

Carroll

[11] Patent Number: 4,826,561

[45] Date of Patent: May 2, 1989

[54] HOLE PUNCHER AND REINFORCER

[75] Inventor: William Carroll, Garden Grove, Calif.

[73] Assignee: The Reinforcer, Inc., Incline Village, Nev.

[21] Appl. No.: 61,291

[22] Filed: Jun. 10, 1987

Related U.S. Application Data

[63] Continuation-in-part of Ser. No. 891,287, Jul. 31, 1986, abandoned.

[51] Int. Cl.⁴ .............................................. B32B 31/00

[52] U.S. Cl. ...................................... 156/518; 83/140; 156/252; 156/261; 156/520; 156/513; 226/96

[58] Field of Search ................................ 83/140, 686; 156/261-262, 513, 521, 518, 520, 252; 226/96

[56] References Cited

U.S. PATENT DOCUMENTS

| | | |
|---|---|---|
| 456,211 | 7/1891 | Anderson . |
| 1,089,587 | 3/1914 | Rowe . |
| 1,147,715 | 7/1915 | Gall . |
| 1,380,492 | 6/1921 | Moore . |
| 1,879,233 | 9/1932 | Henry, Jr. . |
| 1,977,000 | 10/1934 | Landrock . |
| 2,228,372 | 1/1941 | Stuhlinger . |
| 2,245,472 | 6/1941 | Goldstein . |
| 2,285,447 | 6/1942 | Lichter . |
| 2,326,697 | 8/1943 | Stuart . |
| 2,353,232 | 7/1944 | Greene . |
| 2,437,022 | 3/1948 | Fritzinger . |
| 2,441,821 | 5/1948 | Kendall . |
| 2,512,822 | 6/1950 | Barsh . |
| 2,541,444 | 2/1951 | Storey et al. . |
| 2,557,831 | 6/1951 | Lucenti . |
| 2,583,944 | 1/1952 | Hirszson et al. . |
| 2,771,009 | 11/1956 | Carroll et al. . |
| 2,822,046 | 2/1958 | Krueger . |
| 2,973,890 | 3/1961 | Krueger . |
| 3,028,795 | 4/1962 | Hughes . |
| 3,101,478 | 8/1963 | Oussani . |
| 3,125,006 | 3/1964 | Weicher et al. . |
| 3,147,657 | 9/1964 | Williamson .......................... 83/140 |
| 3,180,192 | 4/1965 | Pauk et al. . |
| 3,226,283 | 12/1965 | Villalon . |
| 3,355,344 | 11/1967 | Brody et al. . |
| 3,527,632 | 9/1970 | Holes et al. . |
| 3,898,919 | 8/1975 | Grimaldi, Jr. . |
| 4,007,653 | 2/1977 | Cady .................................... 83/140 |

FOREIGN PATENT DOCUMENTS

| | | |
|---|---|---|
| 597324 | 5/1934 | Fed. Rep. of Germany . |
| 1180663 | 6/1959 | France . |

*Primary Examiner*—David Simmons

*Attorney, Agent, or Firm*—Fulwider, Patton, Lee & Utecht

[57] ABSTRACT

A hole puncher and reinforcer for locating a length of adhesive tape in overlying relation to a sheet of paper, for punching a hole in the tape and paper, and for shearing and pressing the tape in position as a reinforcement for the punched holes. The device includes a plurality of spaced apart first disks operative to engage the adhesive side of the tape and pull it off a supply roll. A similar set of disks rotatable at a peripheral speed faster than that of the first disks engages the tape and directs it through a tape feed passage defined in part by thin fingers. The placement and rotation of the two sets of disks, and the presence of the fingers, enables advancement of the tape to the punch, shear and pressure mechanism without sticking or gumming.

21 Claims, 3 Drawing Sheets

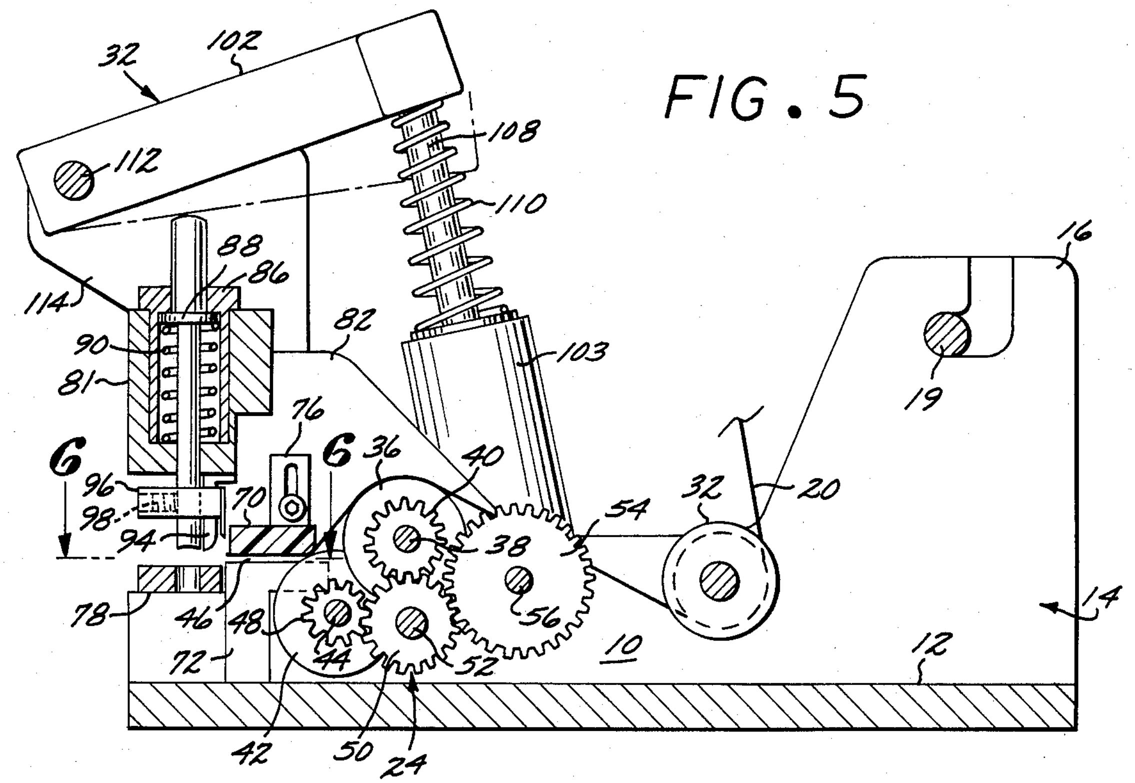
FIG. 5
FIG. 6
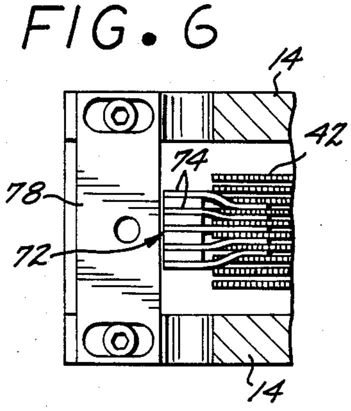
FIG. 7
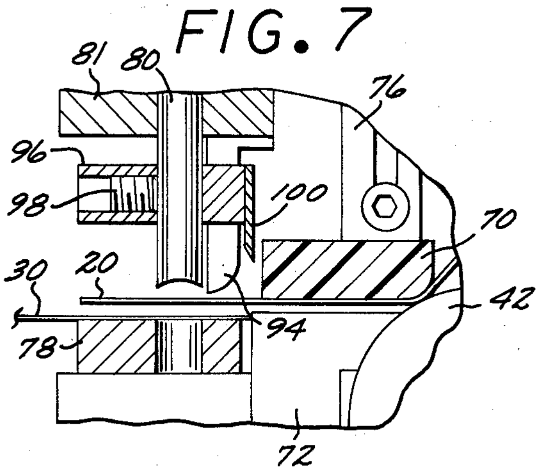
FIG. 8
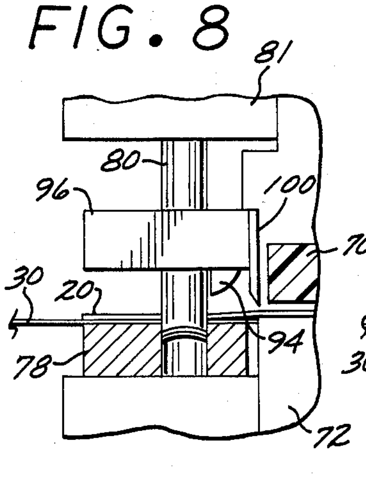
FIG. 9
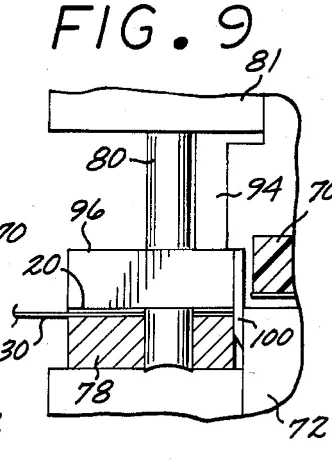
FIG. 10
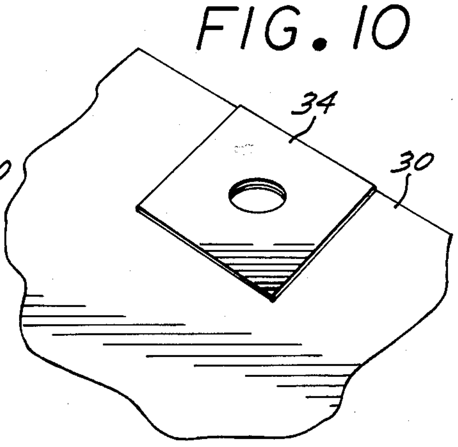

HOLE PUNCHER AND REINFORCER

CROSS REFERENCE TO RELATED APPLICATION

This application is a continuation-in-part of U.S. patent application Ser. No. 891,287, filed July 31, 1986, and entitled "Hole Puncher and Reinforcer", now abandoned.

BACKGROUND OF THE INVENTION

1. Field of the Invention

The present invention relates to a hole puncher and reinforcer for positioning adhesive tape over a sheet of material to be reinforced, punching a hole in both the tape and the sheet, and shearing off the punched tape section.

2. Description of the Prior Art

Various machines have been advanced in the prior art for punching holes in looseleaf sheets of paper and contemporaneously applying reinforcing material around the punched holes.

In the apparatus of U.S. Pat. No. 3,898,919, annular disks are punched out of pressure sensitive adhesive tape and pressed around looseleaf sheet holes which are to be reinforced. The web of punched or waste tape passes over a take-up roll which is driven to pull fresh tape through the punch mechanism. Tape wastage is unavoidable because the waste tape web is an integral part of the feed means.

In U.S. Pat. No. 2,353,232 the puncher and reinforcer require use of dry adhesive tape. Disks punched from the tape have to be moistened before being pressed onto the looseleaf sheet. The inability of the machine to handle pressure sensitive tape is a serious shortcoming.

U.S. Pat. No. 2,441,821 teaches an apparatus having an apertured spring plate over which a paper sheet is positioned. Pressure sensitive tape is fed beneath the spring plate, with its adhesive or sticky side up. The tape feed mechanism is designed to avoid contact with the sticky side of the tape, the tape being fed by a pinwheel whose pins pierce through the nonadhesive side of the tape to advance it as the pinwheel rotates. The paper sheet is pressed downwardly by a die plate which adheres the paper sheet to the tape, and then shears off the adhered tape section. A punch next passes through the aperture in the spring to punch holes in both the sheet and the tape. A special idler roll is used to orient the sticky side of the tape away from the various feed surfaces for attachment to the underside of the paper sheet. This idler roll, the spring plate, and the pinwheel feed are all needed to isolate the feed surfaces from the sticky side of the tape, and all add to the complexity and expense of the apparatus.

U.S. Pat. No. 2,771,009 discloses a feed mechanism having grippers which temporarily hold the adhesive tape to advance it longitudinally. The grippers must disengage the tape to repeat each feeding cycle. Special separator members are required to enable such repetitive separation of the grippers from the sticky tape as it is advanced.

Thus, the punching and reinforcing machines of the prior art are either not designed to handle sticky adhesive tape, or the feed mechanisms they employ to deal with such tape are relatively complex and expensive to manufacture. Other machines are complicated by multiple punches, or are characterized by tape wastage.

SUMMARY OF THE INVENTION

According to the present invention, a hole puncher and reinforcer is provided which is operative either to manually or semiautomatically punch and reinforce a hole in a sheet of material such as looseleaf paper.

In one embodiment of the invention the tape feed mechanism comprises a plurality of adjacent, transversely spaced apart first disks which rotatably engage an adhesive side of the tape to unroll it. A set of second disks located adjacent the first disks are rotated at a peripheral speed faster than that of the first disks to thereby pick up and strip the tape away from the first disks.

Each of the disks of the two sets is relatively thin and preferably peripherally serrated to present a minimum surface area for tape contact. Although a certain degree of adherence of the tape to the disk peripheries is necessary to ensure positive feeding, the tape is nevertheless easily separable from the disks for passage to the punch mechanism without gumming or jamming. This is facilitated not only by the differential rates of rotation of the first and second disks, but also by a location of the second disks in the spaces between the first disks.

Intermittent feeding of the tape is preferably accomplished by a one-way clutch which can be operated either manually, or semiautomatically by a solenoid which is energized when the paper sheet is properly positioned. Actuation of the tape feed is closely followed by operation of the punch mechanism, both operations being accomplished by a single actuating means.

The punch mechanism includes a die, a vertically reciprocable punch, a presser block and a cutting blade. The punch and die form the punched hole, the blade shears the tape, and the presser block presses the sheared length of tape onto the underlying paper sheet. In one embodiment the punch holds the tape and sheet during the shearing and pressing steps. In another embodiment the presser block holds the tape and sheet during punching and shearing, and also during upward withdrawal of the punch.

The hole puncher and reinforcer includes means to adjust the location of the punched hole, means to accommodate tapes of different thicknesses, and means to vary the length of the sheared tape sections. Surfaces in actual or potential contact with the adhesive side of the tape are preferably of minimal contact area and made of a material having a low coefficient of friction.

The tape feed system can be disabled to permit use of the apparatus as a hole puncher only.

Other objects and advantages of the present invention will become apparent from the following detailed description taken in conjunction with the accompanying drawings.

BRIEF DESCRIPTION OF THE DRAWINGS

FIG. 5 is a view taken along the line 5—5 of FIG. 2;

FIG. 6 is a view taken along the line 6—6 of FIG. 5;

FIGS. 7–9 are enlarged detail views of the successive positions of the punching, shearing and pressing components during a cycle of operation;

FIG. 10 is an enlarged detail perspective view of a portion of a punched paper sheet with an adhered reinforcement;

DESCRIPTION OF THE PREFERRED EMBODIMENT

GENERAL ARRANGEMENT

Figure 1:
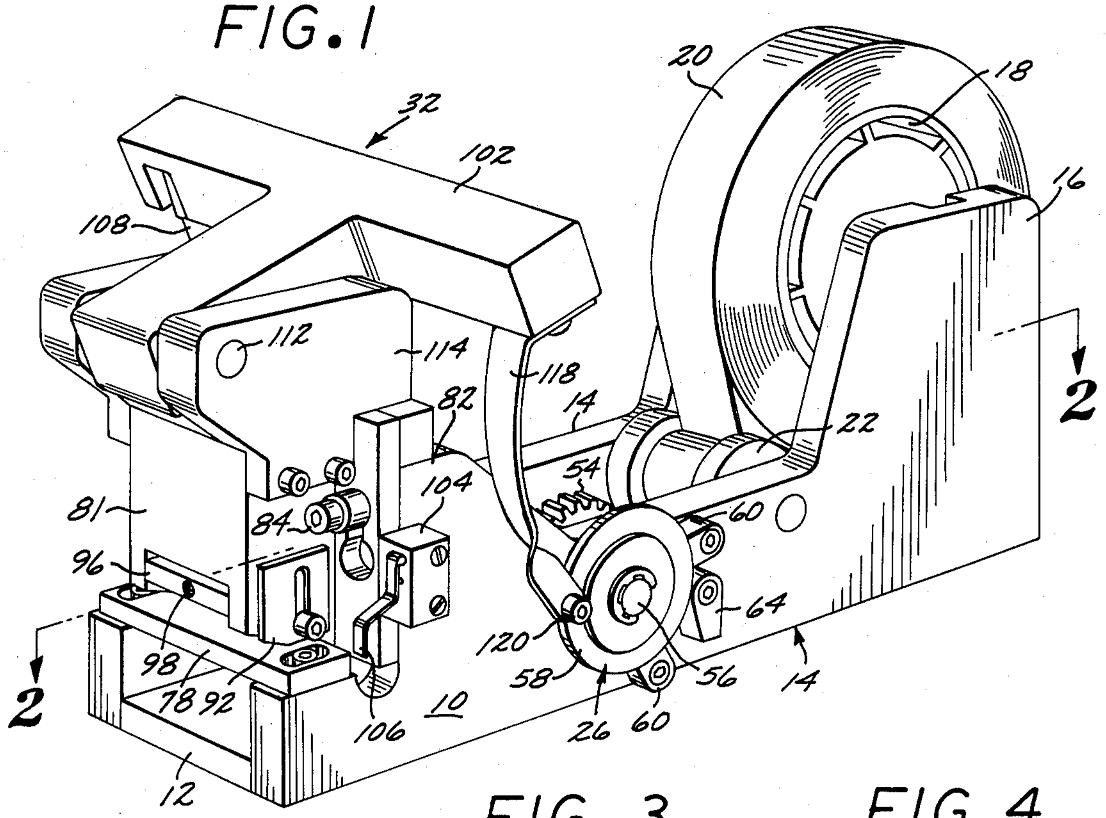
FIG. 1 is a perspective view of a hole puncher and reinforcer according to the present invention.
Figure 2:
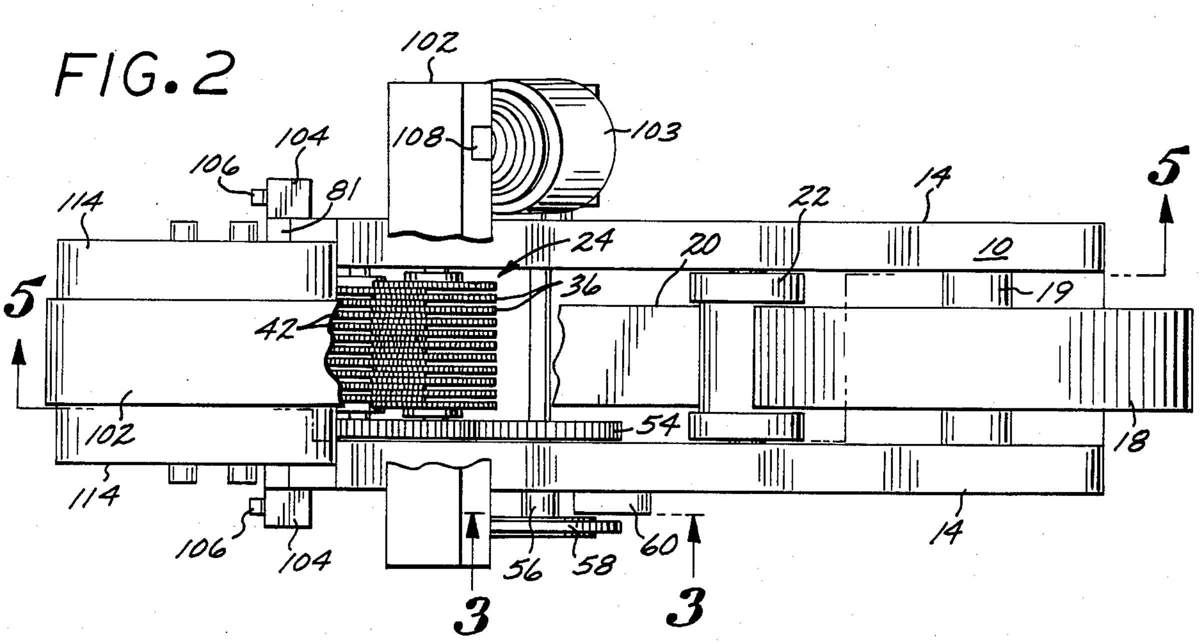
FIG. 2 is a view taken along the line 2—2 of FIG. 1.
Figure 11:
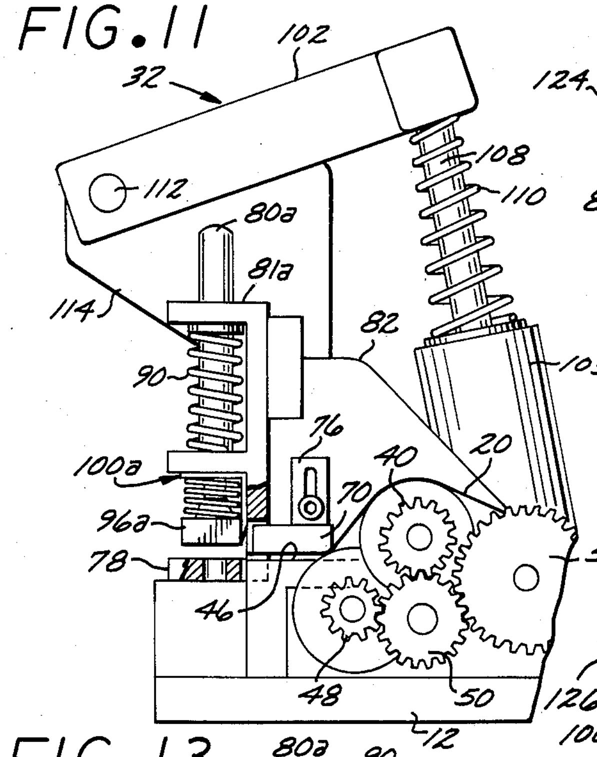
FIG. 11 is a partial side elevational view of a portion of a second embodiment of the hole puncher and reinforcer.

With particular reference to FIGS. 1, 2 and 5 of the drawings, the present hole puncher and reinforcer comprises, generally, a frame 10 having a horizontal, longitudinally extending bed plate 12 to which are attached a pair of vertically oriented sides 14. The sides 14 are of greater height adjacent the frame rear to form a pair of raised support portions 16 grooved to rotatably support a central shaft 19 of a tape reel 18.

The reel 18 carries a supply or roll of adhesive or pressure sensitive tape 20 having a radially inwardly oriented adhesive side. The particular form of tape supply is not important to the present invention, the system shown being one convenient means for supplying tape by unwinding or unspooling it from a commercially available tape roll.

Tape 20 drawn from the reel 18 passes downwardly beneath a central reduced diameter portion of an idler or guide roller 22 mounted on a shaft rotatably supported by the frame side 14.

A tape feed mechanism 24 and a drive assembly 26 for operating the mechanism 24 are also supported by the frame sides 14. Tape from the feed mechanism 24 passes toward the front of the frame 10 for location adjacent a shear and punch assembly 28 mounted to the frame 10. The assembly 28 is operative to punch a hole in a tape 20 and in sheet material such as a paper sheet 30, shear off a predetermined length of the tape and press it onto the sheet to form a reinforcement 34, as seen in FIG. 10.

An actuating apparatus 32 located above the shear and punch assembly 28 is adapted to operate the drive assembly 26 to advance a length of tape, and to operate the shear and punch assembly 28 to shear, punch and press the tape into position.

TAPE FEED MECHANISM

The tape feed mechanism 24 is operative to draw tape from the reel 18 and feed it to the shear and punch assembly 28. It includes a first feed roll comprising a plurality of adjacent, transversely spaced apart, and relatively thin first disks 36 which are each characterized by a serrated periphery. The disks 36 are fixed to a shaft 38 rotatably carried by suitable bearings (not shown) which are attached to the inner, confronting faces of the frame sides 14. The shaft 38 fixedly carries a pinion gear 40 which is rotatable to rotate the disks 36 and bring their peripheries into engagement with the adhesive side of the tape 20. Such engagement moves the tape along a generally downwardly and forwardly inclined path, as best seen in FIG. 5.

The tape feed mechanism 24 also includes a second feed roll comprising a plurality of adjacent, transversely spaced apart and relatively thin second disks 42 substantially identical to the disks 36. The disks 42 are fixedly carried by a transverse shaft 44 for rotation about a transverse axis which is parallel to, but spaced outwardly and forwardly of the axis of rotation of the first disks 36.

The serrated peripheries of the second disks 42 are arranged to engage the adhesive side of the tape 20 and strip it away from the serrated peripheries of the disks 36. This redirects the path of the tape to a generally horizontally oriented path leading into a transverse tape feed passage 46.

The second disks 42 are rotatable by a pinion gear 48 which is fixed to the shaft 44. The diameter of the gear 48 is smaller than that of the pinion gear 40 of the first disks 36. Since the diameters of the disks 36 and 42 are preferably the same, common rotation of the pinions 40 and 48 is effective to rotate the disks 42 at a peripheral speed greater than that of the disks 36.

Portions of the peripheries of the disks 42 project into the spaces between the disks 36, as best seen in FIG. 2, placing the serrated peripheral edges of the disks 42 immediately adjacent the serrated peripheries of the disks 36, and facilitating engagement and redirection of the tape 20 by the disks 42 toward the tape feed passage 46. The placement and interrelationship of the disks 36 and 42 has been found to result in positive separation of the tape from the disks 36 without any gumming or fouling. Such separation is also aided by the faster peripheral speed of the disks 42.

Common rotation of the pinion gears 40 and 48 is accomplished by an intermediate gear 50 fixed to a shaft 52 which is rotatably carried in suitable bearings (not shown) carried by the frame sides 14. Although the use of disks 36 and 42 of the same diameter in association with pinions of different diameters produces the desired differential peripheral speed, it will be apparent that other means to accomplish such a differential speed can be used, if desired.

DRIVE ASSEMBLY

The intermediate gear 50 forms part of the drive assembly 46. It is driven by a gear or drive element 54 fixed to a shaft 56 which is rotatably carried in bearings (not shown) fixed to the frame sides 14. Shaft 56 projects out of one of the frame sides 14, as seen in FIGS. 1 and 2. A one-way clutch 58 is mounted to its projecting end.

Clutch 58 is conventional in construction, readily commercially available, and therefore not described in detail. Movement of the clutch 58 in a counterclockwise direction causes corresponding rotation of shaft 56 and drive element 54, while movement of the clutch 58 in an opposite or clockwise direction causes it to disengage or slip relative to the shaft 56. The action is similar to a ratcheting action, although smoother because of the inherent clutch action. Other means of intermittently operating the feed mechanism may be employed if desired, but the clutch 58 is preferred because it is relatively inexpensive and, as indicated, is readily available.

Figure 3:
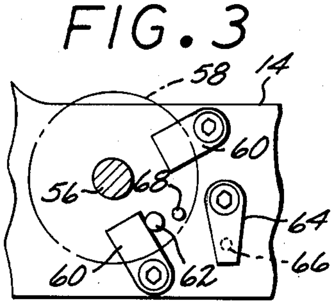
FIG. 3 is an enlarged detail view taken along the line 3—3 of FIG. 2, illustrating the clutch disabling element in its passive position.
Figure 4:
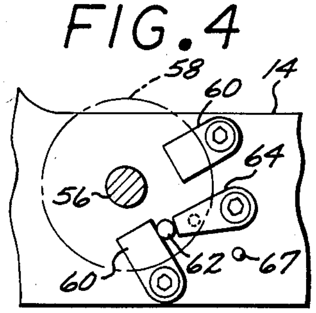
FIG. 4 is a view similar to FIG. 3, but illustrating the disabling element in its active or disabling position to prevent operation of the tape feed mechanism.

Rotation of the clutch 58 in either direction is only partial, the extent of rotation being limited by a pair of elongated stops 60, as seen in FIGS. 3 and 4. Each stop 60 is secured at one end to the adjacent frame side 14 by an Allen head bolt which can be loosened to adjust or reposition the location of the inner or free end of the stop 60. A stop pin 62 fixed to and projecting outwardly of the clutch 58 is engagable by the free ends of the stops 60. One stop 60 limits the degree of rotation of the clutch in a clockwise direction, while the other stop 60 limits the degree of counterclockwise rotation. As will be seen, the degree of partial rotation in a counterclockwise direction establishes the length of tape 20 fed during each cycle of operation.

A disabling stop 64 is selectively operable to prevent any movement of the clutch 58, and consequently any operation of the feed mechanism. Stop 64 is mounted adjacent clutch 58 in a manner similar to the mounting of the stops 60, but it is characterized by a recess or detent 66 located on the underside of its free extremity. This detent 66 receives or overlies a projection or button 67 on the frame side 14, which tends to maintain the stop in the passive position of FIG. 3. On deliberate movement of the stop onto the adjacent surface of the clutch 58, as seen in FIG. 4, the detent 66 will receive or overlie a projection or button 68 integral with the clutch face. This tends to maintain the stop in a position in which the end of the stop engages pin 62 and prevents rotation of the clutch 58 in a counterclockwise or tape feeding direction. As will be seen, this enables utilization of the hole puncher and reinforcer solely as a hole puncher.

TAPE GUIDE MEANS

The tape path established by the action of the second disks 42 is generally aligned with the tape feed passage 46. As best seen in FIGS. 1 and 5, the passage 46 is defined by a transversely disposed upper tape guide 70 and by the horizontal leg of a lower tape guide 72 of inverted L-shape which is rigidly affixed to the frame bed plate 12.

The underside of guide 70 defines an upper passage surface or boundary for the nonadhesive side of the tape 20. The opposite or confronting surface of guide 72 defines a lower passage surface spaced from the upper passage surface a distance greater than the thickness of the tape so that the tape can freely longitudinally pass through the tape feed passage 46.

The horizontal or upper leg of the lower tape guide 72 is preferably formed or cut into a plurality of relatively thin, longitudinally directed fingers 74 which project into the spaces between the second disks 42, as seen in FIG. 6. This provides for stripping of the tape 20 from the serrated peripheries of the disks 42 for smooth transition to the horizontally oriented upper surfaces of the fingers 74. Gumming and fouling of the tape is prevented by the small surface area presented by the finger surfaces.

The corner of the guide 70 at the entry or inlet to passage 46 is rounded to facilitate movement of the tape 20 through the passage 46. In addition, both guides 70 and 72 are preferably made of a low friction material such as tetraflouroethylene material, one form of which is known in the trade by the trademark "Teflon".

As best seen in FIG. 5, the upper tape guide 70 is fixed to a pair of vertically oriented brackets, one of which is illustrated at 75. Each is vertically slotted to receive an Allen head machine bolt which can be loosened and retightened to enable adjustment of the vertical position of the guide 70, and thus the height of the tape feed passage 46. Also as seen in FIG. 5, the lower passage surface defined by the upper surfaces of the fingers 74 is located above the upper surface of a die 78 which is associated with the shear and punch assembly 28. As will be seen, this prevents the sticky side of the tape 20 from adhering to the sheet 30 until the assembly 28 urges the tape downwardly. Premature engagement of the tape 20 with the sheet 30 would result in adherence of the tape end to the sheet prior to full advance most of the tape to its proper position over the sheet.

SHEAR, PUNCH AND PRESS ASSEMBLY

The shear and punch assembly 28 is located adjacent the outlet side of the tape feed passage 46 and is operative to punch a hole in the length of tape 20 projecting from the passage outlet, as well as in the underlying paper sheet 30, as seen in FIGS. 7 and 8. The assembly 28 is also operative to shear off the tape 20 and press it into adhering relation to the paper sheet 30, as seen in FIGS. 9 and 10.

The assembly 28 comprises a punch 80 and the die 78. The die 78 is defined by a laterally disposed plate having a centrally located vertical opening sized to receive the punch 80. Die 78 is secured across the upper forward portions of the frame sides 14 by Allen head machine bolts which are disposed through elongated countersunk slots in the extremities of the die 78, as best seen in FIG. 1. This arrangement enables the longitudinal location of the opening in the die 78 to be adjusted for precise alignment with the vertically reciprocable punch 80.

Die 78 is located a slight distance away from the lower tape guide 72 to provide a space within which a blade 100 of the assembly 28 can be received, as will be seen.

Punch 80 extends upwardly through an opening in the base of a generally T-shaped punch housing 81, the laterally located legs of the T being secured to higher forward end portions 82 of the frame sides 14 by Allen head machine bolts 84. The legs are vertically slotted to permit adjustment of the vertical position of the punch housing 81, and hence the vertical position of the lower end of the punch 80.

Punch housing 81 includes a larger diameter counterbore in communication with the lower opening in the punch housing through which the punch 80 extends. A cylindrical spring retainer 86 is press fitted within this counterbore, the upper end of the retainer 86 being closed by a wall having a central opening for slidably receiving an enlarged upper end of the punch 80.

An integral annular stop 88 on the punch 80 normally engages the underside of the upper wall of the retainer 86. A compression spring 90 is disposed between the stop 88 and the bottom wall of the retainer 86 to bias the punch 80 toward its upward or inoperative position, as illustrated in FIG. 1. Abrupt movement of the punch 80 downwardly against the bias of the spring 90 by impact against its upper end effects the desired punching action.

The lateral, outwardly directed side faces of the punch housing 81 mount a pair of vertically slotted plates 92 whose vertical positions are adjustable to engage the paper sheet 30 and maintain it out of contact with the lower end of the punch 80 in the upper or inoperative position of the punch. This enables a paper sheet 30 to be located in position for punching without hitting the lower end of the punch.

Punch housing 81 also carries a downwardly depending deflecting finger 94, as seen in FIG. 1, which is rounded on its rearward face. It is located adjacent the punch 80 and the outlet of the tape feed passage 46, in position to deflect the tape 20 away from the lower end of the punch 80 as the tape passes out of passage 46.

A transversely oriented presser block 96 having a flat underside includes a central opening to permit it to be slid up onto the punch 80 to a predetermined position. It is fixed in position by a set screw 98 which is threaded within a suitable opening in the block 96. The screw 98 bears against the punch 80 to secure the block 96 in position.

The inward or rearward face of presser block 96 mounts a depending shear or cutting blade 100. As seen in FIGS. 7–9, the blade 100 and block 96 are located such that there is an initial punching of tape 20 and paper sheet 30 and, while the punch holds the punched tape and paper in position, the blade 100 next shears off the length of tape which constitutes the reinforcement 34. This is followed by a pressing action of the presser block 96 to firmly adhere the reinforcement 34 to the paper sheet 30. On shearing of the tape, blade 100 passes into the space defined between the die 78 and the lower tape guide 72.

ACTUATING APPARATUS

The actuating apparatus 32 is operative to first operate the drive assembly 26 to advance the proper length of tape out of the tape feed passage 46, and then to operate the shear and punch assembly 28. Actuating apparatus 32 comprises a T-shape handle 102 which can be depressed manually. It can also be pulled down semi-automatically by an electrically energizable solenoid 103.

The solenoid 103 is pivotally mounted at its base to a shaft extending out of one of the frame sides 14, as best seen in FIG. 2. Solenoid 103 is electrically connected by suitable leads (not shown) to a source of electrical energy. A pair of usual and conventional switches 104 are located in the electrical circuit to the solenoid such that both switches must be closed for energization of solenoid 103 to occur. The pair of switches 104 are attached to the side faces of the frame end portions 82, and their switch arms 106 project forwardly for engagement by the paper sheet 30. If the paper sheet is properly located and not skewed, both switch arms 106 will be moved to close both switches 104 and energize solenoid 103. On solenoid energization, a core or plunger 108 of the solenoid is pulled downwardly against the bias of a compression spring 110. The spring is coiled about the plunger 108 and bears at its opposite ends against the solenoid base and the underside of handle 103.

The upper end of plunger 108 is pivotally attached to the handle 102, and is operative to pull it abruptly downwardly to the phantom line position of FIG. 5 when the solenoid 103 is energized.

Handle 102 is pivotally mounted to a transverse shaft 112 which is carried at its opposite ends by a pair of trunnion plates 114 fixed to opposite sides of the punch housing 81 by pairs of Allen head bolts 116. As best seen in FIG. 5, the upper end of punch 80 is normally spaced from the undersurface of the handle 102 so that initial depression of the handle 102 does not depress the punch 80. Instead, initial handle depression actuates the assemblies 26 and 28 by means of an elongated, generally vertically oriented strap or link 118 which is connected at its upper end to handle 102. It is pivotally connected at its lower end to the one-way clutch 58 by a bolt 120.

OPERATION

In operation, a paper sheet 30 is inserted into a position overlying the die 78, as seen in FIG. 7. If the paper sheet 30 is properly oriented the switch arms 106 of the switches 104 are both actuated and solenoid 103 is energized. This pulls handle 102 downwardly, rotating the oneway clutch 58 and its associated drive element 54 through a partial counterclockwise rotation. Disks 36 and 42 are simultaneously rotated, with disks 42 being rotated at a peripheral speed greater than that of disks 36 to strip the tape 20 away from the disks 36 and redirect it along a horizontal path coincident or in alignment with the horizontal tape feed passage 46. The relatively small surface area of the peripheries of the disks 36 and 42 prevents strong adherence of the tape 20, although the adherence is sufficient to pull the tape 20 off the tape supply roll. This absence of strong adherence is important to prevent gumming and sticking of the tape on the feeding disks. Equally important is to provide a relatively small surface area for the bed or lower wall of the feed passage to the punch and shear station. The thin fingers 74 accomplish this and provide horizontally directed transition surfaces upon which the tape will not gum and stick as it passes from the feed mechanism to the punch and shear apparatus. Making the tape passage of generous size and utilizing Teflon materials further helps to prevent sticking. Moreover, the location of the finger surfaces above the surface of the adjacent die 78, together with the horizontal projection of the tape over the die, as seen in FIG. 7, is important to prevent sticking of the tape to the sheet 30 before the tape is fully projected to the illustrated position. Gumming and sticking of the tape must be prevented and it has been found that the foregoing construction uniquely satisfies this requirement.

The tape 20 is moved out of passage 46 a distance determined by the location of the stops 60. An instant later, handle 102 contacts the punch 80 to punch a hole in the paper sheet 30 and tape 20, as seen in FIG. 8. This is followed by cutting of the tape 20 by the cutting blade 100, as seen in FIG. 9, accompanied by the pressing action of the presser block 96. This firmly adheres the tape to the paper sheet 30 in the form of the reinforcement 34 seen in FIG. 10.

Should it be desired to simply punch a hole in the paper sheet 30 without attachment of a reinforcement 34, the disabling stop 64 can be moved to the position of FIG. 4 to prevent rotation of the clutch 58 and advancement of the tape.

It has been found that coaction of the interfitted disks 36 and 42, together with their differential peripheral speeds, is uniquely effective to feed tape to the shearing and punching station without significant tape adhesion to any of the guide surfaces over which the tape passes.

In the foregoing embodiment the operational sequence was to feed or project the tape, punch it, shear it, and then press the sheared tape portion onto the sheet 30 by a presser block fastened to or integral with the punch. Holding of the tape by the punch prevents its movement during the ensuing shearing step. In a second embodiment of the apparatus, as seen in FIGS. 11–15, a different presser mechanism is used. It holds the sheet 30 in place during punch withdrawal to insure clean separation of the punch from the sheet, i.e. without any adherence of the adhesive reinforcement to the withdrawing punch.

The second embodiment includes components which are identical to components of the first embodiment, and these are designated by identical numerals. Other components which are not identical but which are similar are assigned the same numerals but with the subscript "a". New components are assigned new numbers. As will be seen, the major differences between the embodiments are in the punch, shear and presser assembly.

MODIFIED SHEAR, PUNCH, AND PRESS ASSEMBLY

The shear, punch and press assembly 28 comprises a punch 80*a* modified to include a larger diameter upper portion 122. The punch housing 81*a* is also modified to include integral, laterally projecting upper and lower supports 124 and 126 having openings which vertically slidably support the punch upper portion.

Figure 12:
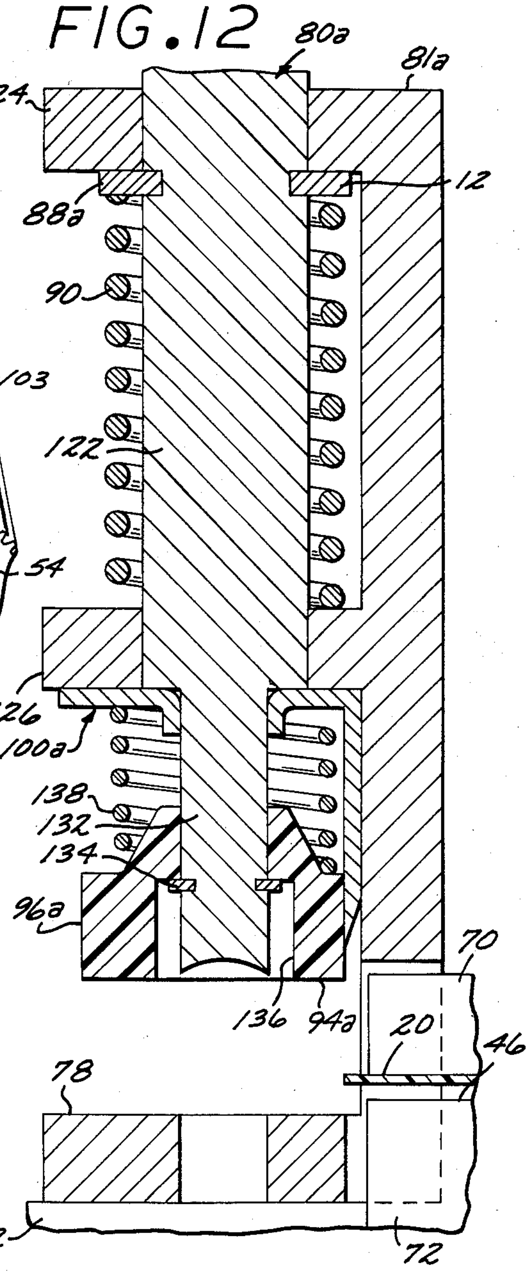
FIG. 12 is an enlarged longitudinal cross sectional view of the punch, press and shear assembly of the embodiment of FIG. 11, illustrating the location of the components prior to actuation.

The punch upper portion 122 includes an annular groove which accepts a snap ring 128 to limit upward movement of the punch beyond the position illustrated in FIG. 12. The punch 80*a* is urged toward this position by the compression spring 190 which is located between the supports 124 and 126. The spring bears against the snap ring 128 and tends to raise the punch to the position of FIG. 12.

The reduced diameter lower portion 132 of the punch is located well above the tape feed passage 46, out of the way of freshly fed tape.

A modified blade assembly 100*a* includes a centrally apertured horizontal portion vertically slidably mounted to the punch lower portion 132. The assembly also includes a vertically oriented shear or blade portion located adjacent the punch housing 81*a* normally just above the lower end of the punch 80*a*.

The punch portion 132 includes an annular groove which receives a snap ring 134. The ring 134 normally engages the base of a central bore 136 which is provided in a modified presser 96*a*. The presser is carried by the punch lower portion 132, and is vertically slidable relative to the portion 132 and the adjacent blade of the blade assembly 100*a*. A compression spring 138 between the presser 96*a* and horizontal portion of the blade 100*a* tends to urge the presser 96*a* to the extended position illustrated in FIG. 12, with the pressing surface of the presser substantially coterminous with the end of the punch.

OPERATION OF SECOND EMBODIMENT

Figure 13:
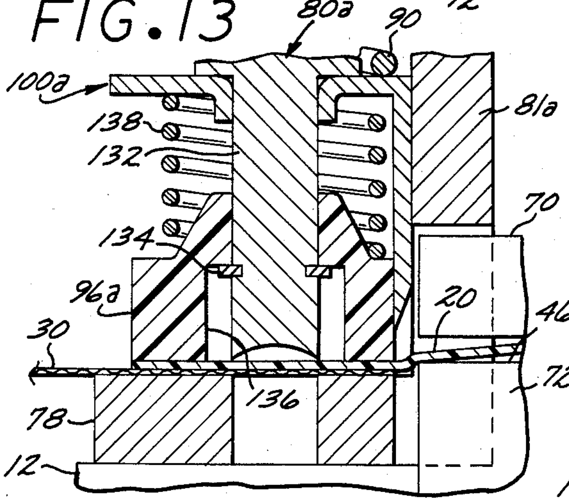
FIG. 13 is a portion of the showing in FIG. 12, but illustrating the location of the components just prior to the punching and shearing steps.

Once a paper sheet 30 has been inserted into position overlying the die 78, and a proper length of adhesive tape 20 advanced into position over the sheet 30, as seen in FIG. 13, the actuating apparatus 32 is operated to bring the presser 96*a* downwardly. It engages the tape, brings it downwardly and presses it into adherence with the sheet 30 as the spring 138 compresses, as seen in FIG. 13. The tape does not touch the paper until the presser urges it downwardly.

Figure 14:
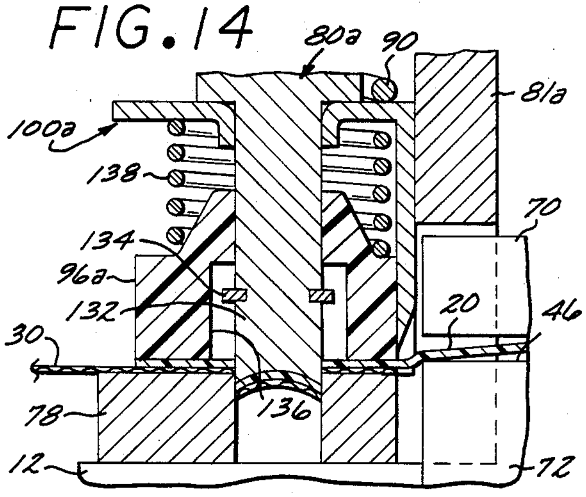
FIG. 14 is a showing like that of FIG. 13, but illustrating the location of the components after the punching step and prior to the shearing step.

Continued downward movement of the punch 80*a* continues to compress the spring 138, followed or accompanied by compression of the spring 90, and holes are punched in both the tape and the sheet, as seen in FIG. 14. This is followed by shearing of the tape and paper, as seen in FIG. 15.

Figure 15:
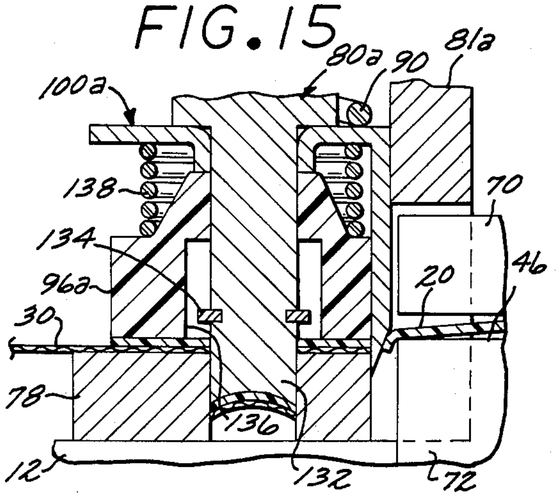
FIG. 15 is a showing like that of FIG. 13, but illustrating the location of the components after the shearing step and prior to upward movement or withdrawal of the punch.

Upon withdrawal of the punch 80*a*, the spring 138 initially remains compressed, as seen in FIG. 15, while the spring 90 expands and raises the punch. Once the punch is substantially fully raised or withdrawn, the spring 138 begins to expand and raise the presser 96*a* out of engagement with the tape and paper. The presser 96*a* thus firmly holds the tape and paper in position and assures that they do not rise with the withdrawing punch.

Various modifications and changes may be made with regard to the foregoing detailed description without departing from the spirit of the invention.

I claim:

1. A hole puncher and reinforcer comprising:

frame means;

supply means carried by the frame means for rotatably supporting a roll of tape having a sticky side characterized by pressure sensitive adhesive;

tape guide means carried by the frame means and defining a tape feed passage having an inlet and an outlet and adapted to longitudinally slidably support a length of the tape for projection out of the tape feed passage, the tape guide means including a plurality of transversely spaced apart horizontal guide fingers defining the lower surface of the tape feed passage for slidably engaging the sticky side of the tape;

shear and punch means carried by the frame means adjacent the outlet and including a punch and die operative to punch a hole in a length of tape projecting out of the outlet with the sticky side down, and also to punch a hole in sheet material underlying the tape, the upper surface of the die lying parallel and in underlying relation to the lower surface of the tape feed passage defined by the guide fingers whereby the length of tape projected out of the tape feed passage is out of engagement with the sheet material, and further including a shear operative to shear off the length of tape for adherence to the upper side of the sheet;

first feed roll means supported by the frame means for rotation about a transverse first axis and comprising a plurality of adjacent, transversely spaced apart first disks having peripheries adapted to engage the sticky side of the tape and move it along a first path;

second feed roll means supported by the frame means for rotation about a transverse second axis parallel to and spaced from the first axis and comprising a plurality of adjacent, transversely spaced apart second disks having peripheries adapted to engage the sticky side of the tape as it passes from the first disks, thereby to move the tape along a second path leading onto the guide fingers of the tape feed passage;

drive means operative for simultaneously rotating the first and second disks through partial rotations whereby the first disks advance the tape, the drive means and the second disks being cooperative to drive the peripheries of the second disks at a rate greater than that of the first disks whereby the tape is stripped away from the first disks for movement along the second path and onto the guide fingers, the transversely spaced apart guide fingers having inner extremities located between certain adjacent ones of the second disks, and the guide fingers extending from the second disks to positions adjacent the punch above the upper surface of the die for providing a reduced contact surface area with the tape sticky side to permit displacement through the tape feed passage, the guide fingers being vertically displaced above the die whereby the tape is substantially linearly directed through the tape feed passage.

2. A hole puncher and reinforcer according to claim 1 wherein the peripheral portions of the second disks project into the transverse spaces between peripheral portions of the first disks.

3. A hole puncher and reinforcer according to claim 1 wherein the first and second disks are of the same diameter and the drive means is operative to rotate the second disks at a rate greater than that of the first disks.

4. A hole puncher and reinforcer according to claim 1 and including actuating means operative to first operate the drive means for advancing a predetermined length of tape out of the outlet, and thereafter to operate the shear and punch means.

5. A hole puncher and reinforcer according to claim 4 wherein the actuating means comprises a solenoid electrically energizable to operate the drive means and the shear and punch means, and including switch means carried by the frame means and operative upon engagement by sheet material to couple the solenoid to a source of electrical power and electrically energize the solenoid.

6. A hole puncher and reinforcer according to claim 4 wherein the drive means comprises a drive element and one-way clutch means positively engagable with the drive element on movement of the clutch means in one direction to rotate the drive element through a predetermined partial rotation and effect partial rotations of the first and second disks, the clutch means disengaging and slipping relative to the drive element on movement of the clutch means in the opposite direction whereby the drive element is not rotated.

7. A hole puncher and reinforcer according to claim 4 wherein the drive element and the frame means mount stop means interengagable to establish the limits of the partial rotation of the drive element.

8. A hole puncher and reinforcer according to claim 4 wherein the drive element and the frame means mount disabling means interengagable to prevent rotation of the drive element whereby operation of the actuating means operates the shear and punch means without operating the drive means.

9. A hole puncher and reinforcer according to claim 4 wherein the shear and punch means comprises a presser carried by the punch for pressing a length of tape into adhering relation to the sheet material, and the cutting edge of the shear is located below the presser for shearing off the tape prior to engagement thereof by the presser, the cutting edge during shearing being movable into the space between the die and the outlet.

10. A hole puncher and reinforcer according to claim 9 and including a deflecting finger carried by the frame means for location adjacent the punch thereby to deflect freshly fed tape to a position below the punch.

11. A hole puncher and reinforcer according to claim 4 wherein the shear and punch means comprises first bias means tending to urge the punch upwardly; a presser vertically slidable on the punch; and second bias means tending to urge the presser downwardly relative to the punch whereby the presser is adapted to remain engaged upon the tape and sheet material during withdrawal of the punch from the tape and sheet material.

12. A hole puncher and reinforcer comprising:

frame means;

supply means carried by the frame means for rotatably supporting a roll of tape having a sticky side characterized by pressure sensitive adhesive;

tape guide means carried by the frame means and defining a tape feed passage having an inlet and an outlet and adapted to longitudinally slidably support a length of the tape for projection out of the tape feed passage, the tape guide means including a plurality of transversely spaced apart horizontal guide fingers defining the lower surface of the tape feed passage for slidably engaging the sticky side of the tape;

shear and punch means carried by the frame means adjacent the outlet and including a punch and die operative to punch a hole in length of tape projecting out of the outlet with the sticky side down, and also to punch a hole in sheet material underlying the tape, the upper surface of the die lying parallel and in underlying relation to the lower surface of the tape feed passage defined by the guide fingers whereby the length of tape projected out of the tape feed passage is out of engagement with the sheet material, and further including a shear operative to shear off the length of tape for adherence to the upper side of the sheet;

first bias means tending to urge the punch upwardly; a pressure vertically slidable on the punch; and second bias means tending to urge the presser downwardly relative to the punch whereby the presser is adapted to remain engaged upon the tape and sheet material during withdrawal of the punch from the tape and sheet material;

first feed roll means supported by the frame means for rotation about a transverse first axis and comprising a plurality of adjacent, transversely spaced apart first disks having peripheries adapted to engage the sticky side of the tape and move it along a first path;

second feed roll means supported by the frame means for rotation about a transverse second axis parallel to and spaced from the first axis and comprising a plurality of adjacent, transversely spaced apart second disks having peripheries adapted to engage the sticky side of the tape as it passes from the first disks to move the tape along a second path leading into the tape feed passage; and drive means comprising a drive element and one-way clutch means positively engageable with the drive element on movement of the clutch means in one direction to rotate the drive element through a predetermined partial rotation and effect partial rotations of the first and second disks whereby the first disks advance the tape said predetermined length, the clutch means disengaging and slipping relative to the drive element on movement of the clutch means in the opposite direction whereby the drive element is not rotated, the drive means being operative to drive the second disks at a rate greater than that of the first disks whereby the length of tape is stripped away from the first disks for movement along the second path; and actuating means to operate said drive means and comprising lever means pivotally carried by the frame means for operation of the punch subsequent operation of the drive means, the transversely spaced apart guide fingers having inner extremities located between certain adjacent ones of the second disks, and the guide fingers extending from the second disks to positions adjacent the punch above the upper surface of the die for providing a reduced contact surface area with the tape sticky side to permit displacement through the tape feed passage, the guide fingers being vertically displaced above the die whereby the tape is substantially linearly directed through the tape feed passage.

13. A hole puncher and reinforcer according to claim 12 wherein peripheral portions of the second disks project into the transverse spaces between peripheral portions of the first disks.

14. A hole puncher and reinforcer according to claim 12 wherein the first and second disks are of the same diameter and the drive means is operative to rotate the second disks at a rate greater than that of the first disks.

15. A hole puncher and reinforcer according to claim 12 wherein the guide fingers are made of low friction plastic material.

16. A hole puncher and reinforcer according to claim 12 and including a solenoid and switch means carried by the frame means and operative upon engagement by sheet material to couple the solenoid to a source of electrical power and electrically energize the solenoid.

17. A hole puncher and reinforcer according to claim 12 wherein the drive element and the frame means mount stop means interengagable to establish the limits of the partial rotation of the drive element.

18. A hole puncher and reinforcer according to claim 12 wherein the drive element and the frame means mount disabling means interengagable to prevent rotation of the drive element whereby operation of the actuating means operates the shear and punch means without operating the drive means.

19. A hole puncher and reinforcer according to claim 12 and including a deflecting finger carried by the frame means for location adjacent the punch to deflect tape away from the punch on operation of the drive means.

20. A hole puncher and reinforcer according to claim 12 wherein the portions of the tape guide means defining the tape feed passage surfaces are made of tetrafluoroethylene material.

21. A hole puncher and reinforcer according to claim 12 wherein the peripheries of the first and second disks are serrated.

* * * * *

UNITED STATES PATENT AND TRADEMARK OFFICE

CERTIFICATE OF CORRECTION

PATENT NO. : 4,826,561

DATED : May 2, 1989

INVENTOR(S) : William Carroll

It is certified that error appears in the above-identified patent and that said Letters Patent is hereby corrected as shown below:

Column 12, line 16, after "in" insert --a--; and

Column 12, line 28, delete "pressure" and insert --presser--.

Signed and Sealed this

Second Day of January, 1990

*Attest:*

JEFFREY M. SAMUELS

*Attesting Officer*

*Acting Commissioner of Patents and Trademarks*